US000001871H

United States Statutory Invention Registration [19]

[11] Reg. Number: H1,871

Majumdar [45] Published: Oct. 3, 2000

[54] RUBBER COMPOUNDS WITH ENHANCED TACK

[75] Inventor: Ramendra Nath Majumdar, Hudson, Ohio

[73] Assignee: The Goodyear Tire & Rubber Company, Akron, Ohio

[21] Appl. No.: 08/717,572

[22] Filed: Sep. 23, 1996

[51] Int. Cl.[7] ..... B60C 13/00; B60C 1/00; C08J 5/10; C08J 5/36

[52] U.S. Cl. ..... 152/524; 152/525; 428/447; 524/322; 524/399

[58] Field of Search ..... 524/322

[56] References Cited

U.S. PATENT DOCUMENTS

| | | | |
|---|---|---|---|
| 3,335,041 | 8/1967 | Osborne | 156/110 |
| 3,914,478 | 10/1975 | Johansson et al. | 427/385 |
| 4,497,927 | 2/1985 | Tai et al. | 524/475 |
| 4,539,365 | 9/1985 | Rhee | 524/495 |
| 4,647,328 | 3/1987 | Rhee | 156/128.1 |
| 4,808,657 | 2/1989 | Brown | 524/525 |
| 5,328,949 | 7/1994 | Sandstrom et al. | 524/262 |
| 5,405,897 | 4/1995 | Segatta et al. | 524/290 |
| 5,447,971 | 9/1995 | Bergh et al. | 523/213 |
| 5,447,992 | 9/1995 | Horvath | 525/287 |
| 5,489,628 | 2/1996 | Sandstrom | 523/213 |
| 5,498,693 | 3/1996 | Marshall et al. | 528/483 |
| 5,504,137 | 4/1996 | Sandstrom et al. | 524/492 |
| 5,504,159 | 4/1996 | Sturm et al. | 525/164 |
| 5,523,351 | 6/1996 | Colvin et al. | 525/124 |

OTHER PUBLICATIONS

Alger, Mark S., *Polymer Science Dictionary*, London School of Polymer Technology, Polytechnic of North London, UK.

Bhowmick, Anil K., et al., *Rubber Products Manufacturing Technology*, (1994), pp. 83, 86.

Eirich, Federick R., *Science and Technology of Rubber*, (1978), pp. 295–297, 322–324, 390, 393, 398–401, 416.

R. T. Vanderbilt Company, Inc., *The Vanderbilt Rubber Handbook*, (1990), pp. 32, 35.

R. T. Vanderbilt Company, Inc., *The Vanderbilt Rubber Handbook*, (1990), 286, 366–367.

Subramaniam, A., *Commercial Elastomers, Natural Rubber*, Rubber Research Institute of Malaysia, p. 23.

*Primary Examiner*—Charles T. Jordan
*Assistant Examiner*—Aileen J. Baker
*Attorney, Agent, or Firm*—Alvin T Rockhill

[57] ABSTRACT

A curable rubber compound having enhanced tack and rubber articles and components, such as tires and treads, made therefrom. Compounds of the invention do not contain wax in an amount that is in excess of the wax's solubility in the rubber. Treads made from compounds of the invention generally do not require cement to secure their splices. Compounds of the invention typically include a formulated fatty acid or alkylated aromatic or phenolic resin, carbon black, natural and/or synthetic rubber, paraffinic or naphthenic oils, and a curing agent. Compounds of the invention have a tack of at least about 3 Newtons. Rubber compounds of the invention, and rubber components made therefrom, can be protected from ozone attack and oxidation by coating an outer surface of the compound and/or component with wax. Treads protected using these methods should have the wax applied to their outer surface subsequent to securing any tread splice.

2 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RUBBER COMPOUNDS WITH ENHANCED TACK

FIELD OF THE INVENTION

The invention relates generally to rubber compounds and methods for enhancing their physical properties and characteristics. More specifically, the invention relates to enhancing the tack in cured rubber compounds, such as tread compounds, while minimizing the potential for crack-growth, reducing the amount of oxidation, and eliminating the need to use a cement to secure a splice.

BACKGROUND OF THE INVENTION

Tack of uncured rubber components, particularly treads, is an important property for building rubber articles, such as tires. The term "tack" as used herein refers to the ability of two uncured rubber materials or surfaces to resist separation after bringing them into contact for a short time under relatively light pressure. It is important that uncured components, such as those in a tire, especially the tread, exhibit tack so that rubber components can be securely adhered and so that splices resist separation prior to vulcanization.

Lack of sufficient tack in uncured rubber components, especially treads, has been an ongoing problem. For many decades, industry has applied cements and/or solvents to uncured rubber components in order to increase their tack. Typically, these solvents and/or cements contain hydrocarbons that can be expensive and hazardous to human health and the environment.

Examples of these cements and/or solvents are disclosed in U.S. Pat. No. 3,335,041, which issued on Aug. 8, 1967, to Alan Paul Osborne. Osborne discloses an adhesive compound that is applied as a coating to one end of a tread splice prior to joining the two ends of the splice together. U.S. Pat. No. 4,808,657, which issued on Feb. 28, 1989, to Robert J. Brown, discloses a rubbery adhesive cement that is useful to enhance the tack of rubber compounds useful to make treads.

U.S. Pat. No. 4,539,365, which issued to Chong-Kon Rhee on Sep. 3, 1985, discloses a universal cement useful for both synthetic and natural rubber compounds. U.S. Pat. No. 4,497,927, which issued to Tai et al on Feb. 5, 1985, discloses a solvent-based tire tread adhesive which provides increased green tack and rapid drying.

Efforts have been made to increase the tack of uncured undertread compounds without use of a cement and/or solvent. For example, U.S. Pat. No. 4,647,328 to Chong-Kon Rhee, which issued on Mar. 3, 1987, discloses a process for making belted tires without the use of an undertread cement. Rhee discloses use of a mixture containing p-t-alkylphenol-formaldehyde tackifying resin, a tri-methyl-dihydroquinoline polymer and a N,N'-disubstituted phenylenediamine in the undertread compound. Rhee also discloses that tread rubber should be processed in a manner that maintains the rubber at a lower temperature to prevent melting of zinc stearate in the compound and its migration or diffusion to the surface of the undertread. However, the Rhee rubber compound and process seemingly require cement to secure the tread splice.

Many rubber compounds useful to make treads contain wax as a processing aid. Waxes tend to be soluble in rubber compounds when hot; but, upon cooling, insoluble fractions tend to bleed to the compound surface. The surface coating formed by wax bleeding to the surface can protect the rubber compound from ozone attack and crack growth after cure. However, this wax coating undesirably tends to reduce tack in the uncured rubber compound. This wax bleeding (or blooming) tends to occur when waxes are added to rubber compounds in excess of their solubility.

There is a need for rubber compounds that have enhanced tack to insure splice integrity of rubber components, without the need for cements, and to insure structural integrity of uncured rubber articles.

SUMMARY OF THE INVENTION

The invention is directed toward curable rubber compounds having enhanced tack. Compounds of the invention contain waxes in amounts less than or equal to their solubility in the compounds to prevent wax bleeding. As used herein, the term "wax" refers to a low-melting organic mixture or compound of high molecular weight that is solid at room temperature and generally is analogous in composition to fats and oils, except that it contains no glycerides. By enhanced tack, it is meant that the tack of an uncured rubber compound of the invention is greater than the tack of an uncured rubber compound having an amount of wax in excess of its solubility formulated therein.

Treads made from compounds of the invention do not require a solvent or cement to insure resistance to splice separation. Uncured rubber compounds of the invention have a tack of at least 3 Newtons. Tack is measured in accordance with the TACK Test described below. Preferably, compounds of the invention have a tack of at least 4 Newtons. The invention is also directed toward rubber articles and components, such as treads and tires, made from compounds of the invention.

Methods of protecting rubber compounds from oxidation and ozone attack are also disclosed herein. These methods involve applying a wax to the outer surface of uncured rubber compounds of the invention, or rubber components made therefrom, to reduce deterioration of the rubber compounds through ozone attack and oxidation.

Compounds of the invention generally contain a formulated fatty acid or alkylated naphthenic or aromatic resin, carbon black, naphthenic and/or paraffinic oils, natural rubber and/or synthetic rubber and a curing agent. When an alkylated naphthenic or aromatic resin is included in the compound, oils may not need to be included in the compound formulation.

As used herein, the term "formulated fatty acid" refers to materials, such as zinc soaps, zinc oleate and zinc ethylhexanoate. Useful formulated fatty acid compounds having zinc soap therein include Interlube™ 292, D-148 Dry™, ZMS1112, ZMS1113 and D-148 Wet™. Useful alkylated naphthenic or aromatic resin containing compounds include Promix™ 400. Compounds of the invention also exhibit a crack-growth of not greater than 4 mm after 2,400,000 cycles and, preferably, not greater than 2 mm after 2,400,000 cycles. The crack-growth is measured using a fatigue to failure tester as described below in accordance with the CRACK-GROWTH Test.

The methods of protecting curable rubber compounds include preparing a curable rubber compound of the invention and coating its outer surface with wax. Methods of protecting treads in accordance with the invention involve preparing a compound of the invention, extruding it into a tread, and coating an outer surface of the tread with wax. The tread is usually coated with wax after the tread is built into a tire and any tread splice is secure. Coating the outer surface of a rubber component or compound with wax tends to reduce crack-growth in compounds where the amount of wax formulated therein is minimized.

The present invention specifically discloses a curable rubber compound comprising: a formulated fatty acid, carbon black, naphthenic or paraffinic oils, rubber and a curing agent; wherein the compound has a tack of at least about 3 Newtons. The present invention also discloses a curable rubber compound comprising: an alkylated naphthenic or aromatic resin, carbon black, rubber and a curing agent; wherein the compound has a tack of at least about 3 Newtons. In addition, the present invention discloses a curable rubber compound comprising: zinc soap, carbon black, naphthenic or paraffinic oils, natural rubber, synthetic rubber and a curing agent; wherein the compound has a tack of at least about 4 Newtons. The invention discloses treads made from these compounds and tires made from these compounds.

The invention also discloses a method of protecting curable rubber compounds, said method comprising steps of: (a) preparing a curable rubber compound comprising: a formulated fatty acid, carbon black, naphthenic or paraffinic oils, rubber and a curing agent, wherein the compound has a tack of at least about 3 Newtons; and (b) coating an outer surface of the compound with wax. The invention is also directed toward a method of protecting curable rubber compounds, said method comprising steps of: (a) preparing a curable rubber compound comprising: an alkylated naphthenic or aromatic resin, carbon black, rubber and a curing agent, wherein the compound has a tack of at least about 3 Newtons; and (b) coating an outer surface of the compound with wax.

The invention also discloses a method of protecting a tread, said method comprising steps of: (a) preparing a curable rubber compound comprising a formulated fatty acid, carbon black, naphthenic or paraffinic oils, rubber and a curing agent, wherein the compound has a tack of at least about 3 Newtons; (b) extruding the compound to form a tread; (c) securing any tread splice; and (d) coating an outer surface of the tread with wax. The invention also discloses a method of protecting a tread, said method comprising steps of: (a) preparing a curable rubber compound comprising: an alkylated naphthenic or aromatic resin, carbon black, rubber and a curing agent, wherein the compound has a tack of at least about 3 Newtons; (b) extruding the compound to form a tread; (c) securing any tread splice; and (d) coating an outer surface of the tread with wax.

DESCRIPTION OF PREFERRED EMBODIMENTS

Rubber compounds of the invention have enhanced tack and an amount of wax, if any at all, that is not in excess of the wax's solubility in the rubber compound. It has been found that insoluble fractions of wax tend to migrate in rubber compounds to the surface and form a wax layer thereon. This wax layer undesirably impairs tack in uncured rubber compounds and in components and articles made therefrom. However, this wax layer can be beneficial in preventing ozone attack, oxidation and crack-growth in the compound.

Thus, wax can be useful as a rubber protectant. Applicant has developed rubber compound compositions and methods for protecting curable rubber compounds, in order to maximize the advantages of wax in curable rubber compounds and to minimize the disadvantages.

Applicant has found that by replacing most, if not all, of the wax in a curable rubber compound with a formulated fatty acid or alkylated naphthenic or aromatic resin, tack can be improved in rubber compounds. Curable rubber compounds of the invention do not contain excess insoluble wax. As used herein, the term "excess insoluble wax" refers to wax in an amount greater than its solubility in the rubber compound.

The invention is also directed toward curable rubber components, such as treads and tires, made from compounds of the invention having enhanced tack. Because of the compound's enhanced tack, treads made from compounds of the invention do not need a solvent or cement to secure their splices. The invention is also directed toward methods of protecting treads and compounds of the invention from crack-growth and oxidation, which can decrease tread and compound durability and useful life.

Rubber Compounds of the Invention

Rubber compounds of the invention include natural and/or synthetic rubber (collectively referred to herein as rubber), carbon black, a formulated fatty acid or an alkylated naphthenic or aromatic resin, and other materials, such as oil, silica, curing agents, antioxidant/antiozonants, stearic acid and zinc oxide, which are known to be included in rubber compounds useable to make rubber components, such as treads and rubber articles, such as tires. Rubber compounds of the invention do not have excess insoluble amounts of wax in their composition. Rubber compounds of the invention have enhanced tack and reduced crack growth as measured according to the TACK Test and CRACK-GROWTH Test detailed below.

Natural and Synthetic Rubber

Natural and/or synthetic rubbers are used in compounds of the invention. A variety of natural rubbers can be included in compounds of the invention. Generally, any type of natural rubber that is useful in curable rubber articles, such as tires, can be used. Useful natural rubbers include high molecular weight linear cis-1,4-polyisoprene extracted from *Hevea brasiliensis* trees. For example, natural rubbers disclosed in U.S. Pat. Nos. 5,405,897 (which issued on Apr. 11, 1995), 5,504,137 (which issued on Apr. 2, 1996), 5,328,949 (which issued on Jul. 12, 1994) and 5,447,971 (which issued on Sep. 5, 1995) and which are all hereby incorporated by reference, are useful in compounds of the invention.

Natural rubber can be included in compounds of the invention in an amount that is sufficient to impart rubber compounds of the invention, and any components made therefrom, with resilience and durability. The amount of natural rubber in the compound tends to vary with the desired end use of the rubber compound. For many applications, the amount of natural rubber included in compounds of the invention is about 40 phr (parts per hundred parts by weight of rubber). In other words, for many applications, of the one hundred parts that are rubber, 40 of those 100 parts are natural rubber. The amount of natural rubber included in compounds of the invention will typically be within the range of about 30 phr to about 50 phr and will more typically be within the range of about 35 phr to about 45 phr.

Rubber compounds of the invention can also include a synthetic diene-based elastomer or rubber that is sulfur-curable. These types of rubbers include cis 1,4-polyisoprene rubber, 3,4-polyisoprene rubber, styrene/butadiene copolymer rubbers, styrene/isoprene/ butadiene terpolymer rubbers and cis 1,4-polybutadiene rubber. Examples of synthetic rubbers that are useful in the compounds of the invention are disclosed in the previously cited U.S. Patents that were incorporated by reference.

The amount of synthetic rubber included in compounds of the invention tends to vary with the desired end product of the rubber compound. For many applications, about 60 phr is synthetic rubber.

Carbon Black

Carbon black is included in compounds of the invention. Carbon black helps to reinforce the structural integrity of the compound and to increase the compound's durability. Any carbon black that is useful in curable rubber compounds for rubber articles, such as tires, is useful in compounds of the invention. For example, N110, N121, N220, N231, N234, N242, N293, N299, N326, N550, N660, N683, N754 and N765 are all useful carbon blacks in compounds of the invention.

The amount of carbon black included in compounds of the invention varies with the type of carbon black used and the desired characteristics of the resulting compound. Typically, carbon black is at least 15 phr of the compound and not greater than about 85 phr. For many applications, carbon black is about 35 phr in compounds of the invention.

Formulated Fatty Acid/Alkylated Naphthenic and/or Aromatic Resin

A formulated fatty acid or alkylated naphthenic and/or aromatic resin is included in compounds. These materials generally serve as processing aids. These, typically, replace wax in compounds of the invention. Formulated fatty acids, such as zinc soap, and alkylated naphthenic or aromatic resins can be combined with additives such as crystalline silica, diatomaceous earth, calcium silicate, calcium salt and silicic acid to form compositions useful in compounds of the invention.

Examples of compositions containing formulated fatty acids or alkylated naphthenic and/or aromatic resins useful in compounds of the invention include Interlube™ 292, (commercially available from Morton International, Inc., of Danvers, Mass.), D-148 Dry™, (commercially available from Morton International, Inc. of Danvers, Mass.), D-148 Wet™, (commercially available from Morton International, Inc., of Danvers, Mass.) and Promix™ 400 (commercially available from Flow Polymers, Inc., of Cleveland, Ohio), M(ZMS13)72 (a 72 percent zinc 2-ethylhexanoate on a synthetic calcium silicate carrier that is commercially available from Polychem Dispersions, Inc. of Middlefield, Ohio), M(ZMS12)72 (a 72 percent zinc 2-ethylhexanoate on a synthetic calcium silicate carrier that is commercially available from Polychem Dispersions, Inc. of Middlefield, Ohio), and zinc oleate (commercially available from Synthetic Products Company of Cleveland, Ohio).

Applicant has found that these types of formulated fatty acid and alkylated naphthenic or aromatic resin containing chemicals tend not to impair the tack of rubber compounds as wax does. Therefore, rubber compounds of the invention that substitute these chemicals in their formulations for waxes, or at least the insoluble waxes, typically, have enhanced tack.

The amount of these chemicals that should be included in compounds of the invention varies with the type of chemical used and the desired characteristics of the end product. Applicant has found that when hydrocarbon-based materials, such as Promix™ 400, are used, they are typically used in greater amounts than the formulated fatty acids. The hydrocarbon-based materials, such as Promix™ 400, can also be used as replacements for naphthenic or paraffinic oils in the compound. In other words, when a hydrocarbon-based material, such as Promix™ 400, is included in the formulation, naphthenic or paraffinic oils may not be needed. Typically, for many applications, the amount of hydrocarbon-based material, such as Promix™ 400, included in the compound is about 13 to 14 phr. For many applications, compounds of the invention contain about 1.00 to about 2.25 phr of a formulated fatty acid material, when it is used in the compound instead of the hydrocarbon-based material.

Other Additives

Compounds of the invention can also include other additives, such as curing agents, accelerators, antioxidants, antiozonants, stearic acid, zinc oxide, oils and silica. These additional ingredients facilitate mixing, cure processing and durability of rubber compounds of the invention.

Rubber compounds of the invention are sulfur-curable. Curing agents included in compounds of the invention are sulfur vulcanizing agents, such as elemental sulfur (free sulfur), or sulfur donating vulcanizing agents, such as an amine disulfide, polymeric polysulfide or sulfur olefin adducts.

The amount of curing agents used in compounds of the invention varies with the type of curing agent used and the desired end product. Curing agents are typically added to the compound in an amount of at least about 0.5 phr and not greater than about 8 phr. For many applications, curing agents are added in an amount of at least about 1.5 phr and not greater than about 3.0 phr.

Typically, rubber compounds of the invention also include accelerators to control the time and/or temperature of the vulcanization process. Any accelerator useable in curable rubber compounds useful in making tires can be used in the invention. Accelerators known in the art, such as zinc oxide, are useful in compounds of the invention. Zinc oxide also serves as a cross-linking agent in compounds of the invention.

The amount of accelerator used in compounds of the invention varies with the vulcanization temperature and desired rate. For many applications, about 3.5 phr of the compound is an accelerator, such as zinc oxide. Antioxidants and/or antiozonants can also be added to rubber compounds of the invention. Antioxidants and/or antiozonants reduce the oxidation and/or degradation of rubber compounds when they are exposed to the atmosphere. An antiozonant is an additive used to protect rubber compounds against effects of ozone-induced degradation. Antiozonants, generally, protect rubber compounds in one of two ways. The first is by providing a physical barrier to ozone penetration by forming a thin surface film of an ozone resisting material, such as wax. The second is by chemically reacting with ozone or polymer ozonolysis products. Chemicals, such as aromatic diamines, are used for this protection mechanism. In particular, p-phenylene-diamine derivatives (PPDs) are most useful.

Preferably, the second type of antiozonant (e.g. PPDs) are used in compounds of the invention. Adding waxes as antiozonants to compounds of the invention can impair the tack of the curable rubber compounds if added in amounts greater than their solubility. Useful types of PPDs are well known in the tire manufacturing industry. For example, antiozonants useful in tires are disclosed in U.S. Pat. No. 5,504,159, which issued on Apr. 2, 1996, to Sturm et al and which is hereby incorporated by reference.

Any known antioxidants useful in curable rubber compounds in the tire industry can be used in the invention. Generally, these chemicals are known to be amine and/or phenolic-based.

The amount of antioxidant and/or antiozonant used in compounds of the invention varies with the type of antioxidant and/or antiozonant that is used and with the end use of the rubber compound. For many applications, antiozonants and/or antioxidants are added in an amount of at least about 3 phr and not greater than about 4 phr.

An agent that insures a uniform rate of cure, such as stearic acid or a stearic acid substitute, can also be included in compounds of the invention. In general, stearic acid and stearic acid substitutes help to insure that there are adequate quantities of soluble zincs in rubber compounds to facilitate cure and to minimize reversions.

The amount of stearic acid or stearic acid substitute, such as $C_{17}H_{31-35}COOH$, used in compounds of the invention can vary with the desired physical properties of the end product. For many applications, stearic acid, or a substitute therefor, is added to the compound in an amount that is within the range of about 0.5 phr to about 4 phr. The amount of stearic acid, or a substitute therefor, added will more typically be within the range of about 1 phr to about 3 phr.

Oils are also, typically, included in rubber compounds of the invention as processing aids. Oils may not be needed when an alkylated naphthenic or aromatic resin containing material, such as Promix™ 400, is used in the rubber compound. Any type of oil useful in rubber compounds used to make tires is useful in the invention. Preferably, naphthenic and/or paraffinic oils are used. Examples of these types of oils are disclosed in the previously cited patents, which were incorporated by reference.

The amount of oil used in compounds of the invention can vary with the types of oils that are used and the desired end product. For many applications, oil in an amount of about 10 phr is included in the invention.

Hydrated silica and a silica-based reinforcing material can also be included in compounds of the invention. These items tend to facilitate enhancement of desirable properties, such as structural integrity and durability, in rubber articles.

Preferably, hydrated silica and a silica/carbon black filler mixture are included in compounds of the invention. Any type of hydrated silica and/or silica/carbon black filler mixture useful in curable rubber compounds can be used in the invention. The amount of hydrated silica and silica/carbon black filler mixture used in compounds of the invention can vary with the type of hydrated silica and silica/carbon black fillers used and with the desired properties of the end product. For many tread compounds, about 6 phr to about 14 phr of the rubber compound is hydrated silica, and about 1 phr to about 4 phr of the rubber compound is a silica/carbon black filler. For instance, about 10 phr of the rubber compound can be hydrated silica, and about 2 phr of the rubber compound can be a silica/carbon black filler.

It is understood that other additives useful in curable rubber compounds, such as coupling agents, peptizers and other processing aids, can be added to compounds of the invention. Rubber components and articles, such as treads, tires, hoses, belts, conveyor belts and bladders can be made from rubber compounds of the invention.

Rubber compounds of the invention and components or articles made therefrom have enhanced tack and reduced crack-growth. Rubber compounds of the invention and components or articles made therefrom have a tack of at least about 3 Newtons when measured using the TACK Test described below. Preferably, rubber compounds of the invention and components or articles made therefrom have a tack of at least about 4 Newtons when measured using the TACK Test, and more preferably, they have a tack of at least about 4.5 Newtons.

Rubber compounds of the invention and components and articles made therefrom have a crack growth of not greater than about 4 mm after 2,400,000 cycles, when the outer surface is coated with wax, and when measured in a fatigue to failure tester in accordance with the CRACK-GROWTH Test described below. Preferably, rubber compounds of the invention and components or articles made therefrom have a crack growth of not greater than about 3 mm after 2,400,000 cycles, when the outer surface is coated with wax, and when measured using a fatigue to failure tester in accordance with the CRACK-GROWTH Test described below.

In addition, rubber components or articles made from compounds of the invention generally do not need solvents, cements or adhesives to secure any of their splices or to adhere them to one another. The enhanced tack in rubber compounds of the invention can facilitate securing splices and rubber components together.

Cured rubber compounds of the invention also have a knotty tear (i.e., projections of rubber from each side of the torn sample) as opposed to an undesirable smooth tear. Rubber compounds of the invention also have a cured adhesion of at least about 40 Newtons, and preferably of at least about 50 Newtons, when measured in accordance with the ADHESION Test described below. Most preferably, compounds of the invention have a cured adhesion of at least about 90 Newtons.

Methods of Protecting Rubber Compounds of the Invention

The invention is also directed toward methods of protecting rubber compounds of the invention by reducing their crack growth and oxidation, while they are exposed to the environment. These methods of the invention involve preparing rubber compounds of the invention, according to formulations disclosed herein, and coating an outer surface of the compound with a wax that is useful in rubber compounding.

Prior to coating with wax, the rubber compound can be converted into a rubber component, and the rubber component can be built or put into a rubber article. For example, if rubber compounds of the invention are used to make a tread, then the compound can be extruded in the form of a tread and built into an uncured tire before its outer surface is coated with wax in accord with methods of the invention. With respect to components that have splices, the splices should be secured prior to coating the outer surface of the component with wax. Otherwise, the wax coating may interfere with the tack of the rubber component and inhibit splice security.

Rubber compounds of the invention, and any components made therefrom, can be coated with wax using any means known in the art. For example, the wax can be melted and sprayed on the compound, or the compound can be dipped in melted wax. Preferably, the wax layer is as thin as possible so that excessive wax is not used. Enough wax is used to protect the rubber compound or any component or article made therefrom. By coating the outer surface with wax, the tack of the rubber is not impaired when needed, but the rubber compound is protected while exposed to the environment.

The following examples are intended to be illustrative and not limiting of the invention.

WORKING EXAMPLES

EXAMPLE 1

Comparison of Rubber Compounds of the Invention with Compounds Containing No Excess Insoluble Wax Five rubber compounds were mixed having the formulations shown in Table I below:

TABLE I

| INGREDIENTS | COMPD-1 | COMPD-2 | COMPD-3 | COMPD-4 | COMPD-5 |
|---|---|---|---|---|---|
| Natural Rubber | 40 | 40 | 40 | 40 | 40 |
| High cis-Polybutadiene | 36 | 36 | 36 | 36 | 36 |
| Styrene-Butadiene Rubber | 14 | 14 | 14 | 14 | 14 |
| Polyisoprene (13% 1,2, 50% 3,4, 37% 1,4) | 10 | 10 | 10 | 10 | 10 |
| Tread Carbon Black | 35 | 35 | 35 | 35 | 35 |
| Antioxidant + Antiozonant (dynamic) | 3.37 | 3.37 | 3.37 | 3.37 | 3.37 |
| Stearic Acid Substitute | 2.00 | 2.00 | 2.00 | 2.00 | 2.00 |
| Zinc Oxide | 3.5 | 3.5 | 3.5 | 3.5 | 3.5 |
| Naphthenic/Paraffinic Oil | 10 | 10 | 10 | 10 | — |
| Waxes | 2.15 | — | — | — | — |
| Interlube ™ 292 | — | 1.25 | — | — | — |
| D-148 Dry ™ | — | — | 1.13 | — | — |
| D-148 Wet ™ | — | — | — | 2.12 | — |
| Promix ™ 400 | — | — | — | — | 13.86 |
| Hydrated Silica | 10 | 10 | 10 | 10 | 10 |
| 50% Si69 in 50% HF-Black | 2 | 2 | 2 | 2 | 2 |
| Curing agents | 2.53 | 2.53 | 2.63 | 2.53 | 2.53 |

All amounts are in parts per hundred rubber (phr).

The natural rubber used was SMR 20 (Standard Malaysian Rubber 20), which is commercially available from The Goodyear Tire & Rubber Co. of Akron, Ohio. The high cis-polybutadiene used was Budene® high cis-polybutadiene, which is commercially available from The Goodyear Tire & Rubber Co. of Akron, Ohio. The styrene butadiene rubber (SBR) used was a solution SBR that had a non-staining medium and a vinyl butadiene/styrene ratio of 88 to 12. This SBR is commercially available from The Goodyear Tire & Rubber Co. of Akron, Ohio, as 1,3-butadiene polymer with ethenylbenzene. This SBR has a specific gravity of 0.93 and a maximum volatiles of 1.2 percent. The polyisoprene used is commercially available from The Goodyear Tire & Rubber Co. of Akron, Ohio.

The carbon black was Huber N299, having a specific quality of 1.7–1.9, available from J. M. Huber Corp. of Borger, Tex. The antioxidant/ antiozonant used was Wingstay® 100, which is diaryl-p-phenylenediamine, and it is commercially available from The Goodyear Tire & Rubber Co. of Akron, Ohio. The other antioxidant/antiozonant used was Santoflex® 13 Antiozonant (6PPD), which is commercially available from Monsanto Company of St. Louis, Mo. Wingstay® 100 and 6PPD were used in ratio 1.15:2.22 (total 3.37 parts). Tall oil fatty acid, a stearic acid substitute, which is commercially available as WESTVACO L-5A (its formula is $C_{17}H_{31-35}$ COOH) from Westvaco Oleochemicals Department of Charleston Heights, S.C. The zinc oxide used was Protox 78®, which is commercially available from The New Jersey Zinc Company. The naphthenic/paraffinic oil used was Tufflo Process Oil 100, which is commercially available from Lyondell Petrochemical Company of Texas. The wax used in compound-1 and to coat the rubber compounds was a 2:1 mixture of Shellwax (R) 230 and Shellwax 400 Goodine, which are both petroleum waxes commercially available from Shell Oil Co. of Houston, Tex. The hydrated silica used was Hi-Sil(R) 210, which is commercially available from PPG Industries, Inc. of Pittsburgh, Pa. The Si69 in HF-Black used was a Si69/carbon black mixture, which is commercially available from Degussa Corporation of Teterboro, N.J. The mixture is a 1:1 mixture by weight of carbon black and Bis-(3-[triethoxysilyl]-propyl)tetrasulfide.

The curing agents used were N-tert-butyl-2-benzo thiazolesulfenamide (commercially available from Monsanto Chemical Co. of St. Louis, Mo.), Tetramethylthiuram Disulfide (commercially available from The Goodyear Tire & Rubber Co. of Akron, Ohio), and sulfur in ratio of 0.9:0.13:1.5 for a total of 2.53 phr.

These rubber compounds were mixed using three mixing stages in a Rheomex® single screw 1" diameter extruder having a System 90 Torque Rheometer therein with attached Banbury type rotor. The capacity of the Banbury was 0.323 liters. This equipment is available as model 111 from Haake Buchler Instruments, Inc. of Saddle Brook, N.J. Tables II, III and IV below show the processing parameters for each of the three mixing stages.

TABLE II

First Mixing Step

| COMPOUND | INITIAL RUBBER TEMP C. | FINAL RUBBER TEMP C. | TOTAL TORQUE N.m.s. |
|---|---|---|---|
| COMPD-1 | 132 | 167 | 27302 |
| COMPD-2 | 133 | 168 | 27302 |
| COMPD-3 | 136 | 168 | 26596 |
| COMPD-4 | 134 | 167 | 26772 |
| COMPD-5 | 130 | 170 | 28067 |

First Mixing Step

The natural rubber was preheated to about 180° F. (82° C.) prior to being added to the mixture. The Banbury was operated at 60 RPM, and the Banbury mixing time was six minutes. This mix time was measured from the time the Banbury ram was lowered after ingredients were added.

The ingredients were added in the following sequence: natural rubber, synthetic rubber, powdered ingredients other than carbon black, and then carbon black.

The discharge temperature of the rubber compound from this stage was about 315° F. (157° C.) to about 345° F. (174° C.). The rubber compound was allowed to cool before entering the second mixing step. The total torque was measured by the equipment from Haake and appeared on a standard equipment print out.

TABLE III

Second Mixing Step

| COMPOUND | INITIAL RUBBER TEMP C. | FINAL RUBBER TEMP C. | TOTAL TORQUE N.m.s. |
|---|---|---|---|
| COMPD-1 | 115 | 147 | 18593 |
| COMPD-2 | 116 | 147 | 18829 |
| COMPD-3 | 118 | 147 | 17652 |

TABLE III-continued

| Second Mixing Step | | | |
|---|---|---|---|
| COMPOUND | INITIAL RUBBER TEMP C. | FINAL RUBBER TEMP C. | TOTAL TORQUE N.m.s. |
| COMPD-4 | 116 | 148 | 18240 |
| COMPD-5 | 115 | 153 | 20477 |

Second Mixing Step

The Banbury was operated at 60 RPM, and the mix time was four minutes. The mix time was measured from the time the ram was lowered after the ingredients were added.

The rubber compound was added to the Banbury first, and then the HISIL and oil were added respectively. The discharge temperature of the rubber was 290° F. (143° C.) to about 310° F. (154° C.).

TABLE IV

| Third (Productive) Mixing Step | | | |
|---|---|---|---|
| COMPOUND | INITIAL TEMP C. | FINAL TEMP C. | TOTAL TORQUE N.m.s. |
| COMPD-1 | 73 | 112 | 17064 |
| COMPD-2 | 76 | 113 | 17299 |
| COMPD-3 | 75 | 111 | 16828 |
| COMPD-4 | 77 | 112 | 16828 |
| COMPD-5 | 74 | 114 | 17827 |

Third Mixing Step

The Banbury was operated at about 60 RPM, and the compound was mixed for 3 minutes. The mix time was measured from the time the ram was lowered.

Half of the rubber compound from previous mixing step was added to the Banbury, and then the productive chemicals were added. Finally, the other half of the rubber was added. The discharge temperature of the rubber was between 230° F. (110° C.) and 240° F. (115.5° C.).

Properties

Table V below shows the resulting properties of the five rubber compounds whose formulations are identified above.

TABLE V

| Properties of the Compounds | | | | | |
|---|---|---|---|---|---|
| COMPOUND | t'90 min | tan delta 0° C. | tan delta 60° C. | E' 25° C. Pa | Fresh Tack |
| COMPD-1 | 12.9 | 0.23 | 0.12 | 0.0796 | 0.9 |
| COMPD-2 | 12.9 | 0.24 | 0.12 | 0.0659 | 6.1 |
| COMPD-3 | 11.7 | 0.23 | 0.11 | 0.0682 | 5.8 |
| COMPD-4 | 12.5 | 0.23 | 0.12 | 0.0689 | 5.7 |
| COMPD-5 | 16.1 | 0.27 | 0.15 | 0.1092 | 6.8 |

As shown in Table I, COMPD-1 is a typical tread rubber compound having wax formulated therein. In COMPD-2, the wax has been replaced with an equivalent amount of Interlube™ 292 internal lubricant, which is commercially available from Morton International, Inc. of Danvers, Mass. In COMPD-3, the wax has been replaced with D-148 Dry™ internal lubricant, which is also commercially available from Morton International, Inc. In COMPD-4, the wax has been replaced with D-148 Wet™ internal lubricant, which also is commercially available from Morton International, Inc. In COMPD-5, the wax and oil were replaced in an equivalent amount with Promix™ 400 internal lubricant, which is commercially available from Flow Polymers, Inc. of Cleveland, Ohio.

As noted above, in the first mixing step, natural rubber was preheated prior to putting it in the small laboratory Banbury. If this preheat is not done, the torque can significantly increase, and the shear pins in the Banbury can break during mixing. However, this preheat step may not be needed in large scale production processes. The final temperature and the total torque requirements were almost the same for the first four compounds in all of the mixing stages. This indicates that the first four compounds have almost the same heat generation during mixing. However, more torque was required to mix compound 5 containing the Promix™ 7 400 compound.

The tan delta values at 0° C. and 60° C. for all of the compounds are about the same. This indicates that the rolling resistance, treadwear characteristics and wet traction for treads made from all the compounds would be about the same.

As shown in Table V, the t'90 in min, tan delta at 0° C. and 60° C. and the E' at 25° C. for all the compounds without wax are maintained, and the tack is increased for the compounds without wax. The cure curves for each of the five compounds were recorded using a Rheometer 100S that is commercially available from Monsanto Chemical Company of St. Louis, Mo. The t'90 is reported for each compound in Table V.

The dynamic mechanical properties of the five compounds, once cured, were measured using a VISCO-elastic tester commercially available from Rheometrics, Inc. of New Jersey. Tan delta values at 0° C. and 60° C. and E' at 25° C. are reported in Table V for each compound. Fresh tack measurements in Newtons are shown in Table V for each compound.

The tack measurements were obtained in accordance with the following TACK Test. The TACK Test measures the interfacial tack of two green samples of stock after having been compressed together with a known force. In general, uncured compound is calendered and test samples are built using precut Mylar™ sheets having five evenly-spaced 5 mm wide windows. These windows are sloped 450° to a point. The sample is pressed together by an automated apparatus for 30 seconds at 2 atmospheres of pressure. The calendered sample is then cut with a specimen die so that five samples are ready to be pulled on a force displacement tester or equivalent with pneumatic jaws, such as is available from Instron.

Enough of the rubber compound was calendered to obtain one 152.4 mm ×304.8 mm ×1.27 mm sheet per sample. The sample was tested within 24 hours of calendering, unless aged tack was measured. A piece of masking tape that was 152.4 mm in length was applied along the grain of the calendered stock. The tape was stitched with a 50.8 mm roller or the equivalent using minimum pressure.

Two samples were cut from the calendered sheet using a specimen die. Each sample was 73.0 mm ×148.2 mm. The exposed surface was not touched. Two precut 5.0 mm Mylar™ sheets were placed on the exposed side of one of the samples. Then the other sample was placed on top of the sheet. The two exposed sides of the samples faced each other with the Mylar™ sheets in between. The sample was placed in an Arbor press with a top and bottom pressure plate. A pressure of 2 atmospheres of pressure were applied per sample area.

The sample was removed from the press and centered under a 25.4 mm ×88.9 mm cutting die assembly that was attached to a second Arbor press. Enough pressure was applied to cut through the sample, which yielded five specimens.

The test was applied at room temperature (i.e. 25° C.+−1° C. and 55 percent relative humidity). The force displacement tester had the following settings: crosshead speed at 127 mm/min, 25 Newtons for full scale and chart speed at 127 mm/min. The end tabs of one specimen were spread, and it was insured that the only adhesion taking place was under the Mylar™ window. The end tabs were clamped in the upper and lower jaws of the tester. The chart was turned on, and the crosshead was engaged. These steps were performed for each of the other four specimens. The chart showed the steady state values of the force to pull the sample apart in Newtons. The tack values shown in the Table herein are the average steady state values for each sample.

Compounds 2–5, which had no insoluble wax therein, were surface-coated with wax by dipping each sample in a melted wax of the same type and amount that was formulated into compound 1. Each sample was then cooled, and the crack-growth properties were then measured. As detailed below, compounds 2–5, when coated with wax, exhibited a crack-growth of less than 4 mm in 2,400,000 cycles. Compound 1, which had wax formulated therein and not coated thereon, also exhibited a crack growth of less than 4 mm within 2,400,000 cycles when measured in accordance with the CRACK-GROWTH Test detailed below. All of the compounds having wax coated on the outer surface had a crack-growth of less than 3 mm at 2,400,000 cycles, and compounds 2, 4 and 5 had a crack-growth of less than 3 mm at 2,400,000 cycles.

Applicant found that the crack-growth properties of the rubber compounds 2–5 without wax formulated therein deteriorated significantly. However, once the outer surface of a tread made from each compound was coated with a thin layer of wax, these crack-growth properties were retained. The crack-growth was measured using the following procedure, which is herein identified as the CRACK-GROWTH Test.

A Monsanto Flexometer, which is commercially available from Monsanto Chemical Co. of St. Louis, Mo., consisting of two sets of 12 specimen racks which hold specimens in a vertical position, side by side, in suitable grips was used. A rack set was comprised of one stationary bar to which grips are attached and one moveable bar that was cycled by a cam at 3.33 Hz. Cured rubber specimens were mounted in the grips. One specimen was placed in each set of upper and lower grips. The specimen strain range was 20 percent and the rate was 200 cycles/minute.

Samples (i.e., specimens) were prepared as follows. Uncured stock was cut into 203×254×2.54 mm (8×10×0.100 in) sheets. The amount of rubber used for molding one sheet was 32 to 34 grams. The curing mold was preheated to about 23° C.±2° C. The uncured sample was placed in the mold as quickly as possible in order to minimize mold cooling and mold thermal lag. Five specimens were cured as one piece using a two-piece curing mold.

The specimens were cut with a die cutter at right angles to the beaded edge. The die cutter was sharp and free from nicks and oil prior to cutting. The specimens had a width of 25.4 mm (1 in.) and a thickness of 1.27+/−0.051 mm (0.05+/−0.002 in.) A 2 mm initial cut was made with a sharp razor blade on the groove by the edge of the specimen.

Three specimen of each compound were tested. A set of control specimen of known crack-growth properties were tested simultaneously with each set of specimens.

EXAMPLE 2

Comparison of Additional Rubber Compounds of the Invention with Compounds Containing No Excess Insoluble Wax Nine rubber compounds were prepared as detailed above. Each of these compounds had the formulations detailed below in Table VI.

TABLE VI

| INGREDIENTS | RM21 | RM22 | RM23 | RM24 | RM25 | RM26 | RM27 | RM28 | RM29 | RM30 |
|---|---|---|---|---|---|---|---|---|---|---|
| Natural Rubber | 40 | 40 | 40 | 40 | 40 | 40 | 40 | 40 | 40 | 40 |
| Solution SBR | 60 | 60 | 60 | 60 | 60 | 60 | 60 | 60 | 60 | 60 |
| Tread Carbon Black | 43 | 43 | 43 | 43 | 43 | 43 | 43 | 43 | 43 | 43 |
| Peptizer | 0.20 | 0.20 | 0.20 | 0.20 | 0.20 | 0.20 | 0.20 | 0.20 | 0.20 | 0.20 |
| Stearic Acid Substitute | 2 | 2 | 2 | 2 | 2 | 2 | 2 | 1.15 | 1.15 | 1.15 |
| Antioxidant + Antiozonant (dynamic) | 3.37 | 3.37 | 3.37 | 3.37 | 3.37 | 3.37 | 3.37 | 3.37 | 3.37 | 3.37 |
| Zinc Oxide | 3.5 | 3.5 | 3.5 | 3.5 | 3.5 | 3.5 | 3.5 | 3.5 | 3.5 | 3.5 |
| Naphthenic/Paraffinic Oil | 7 | 7 | 7 | 7 | 7 | 7 | 7 | 7 | 7 | 7 |
| Waxes | 1.5 | — | — | — | — | — | — | — | — | — |
| Interlube ™ 292 | — | 1.5 | — | — | — | — | — | — | — | — |
| D-148 Dry ™ | — | — | 1.5 | — | — | — | — | — | — | — |
| D-148 Wet ™ | — | — | — | 1.5 | — | — | — | — | — | — |
| Promix ™ 400 | — | — | — | — | 8.5 | — | — | — | — | — |
| 50% Si69 & 50% HF Carbon Black | 3.5 | 3.5 | 3.5 | 3.5 | 3.5 | 3.5 | 3.5 | 3.5 | 3.5 | 3.5 |
| Hydrated Silica | 17 | 17 | 17 | 17 | 17 | 17 | 17 | 17 | 17 | 17 |
| Curing Agents | 2.4 | 2.4 | 2.4 | 2.4 | 2.4 | 2.4 | 2.4 | 2.4 | 2.4 | 2.4 |
| ZMS1112 | — | — | — | — | — | — | — | 1.5 | — | — |
| ZMS1113 | — | — | — | — | — | — | — | — | 1.5 | — |
| Zinc Oleate | — | — | — | — | — | — | — | — | — | 1.5 |

Properties of each of these compounds are detailed in Table VII below:

The curing agents used in these formulations were the same as in the previous example, except the ratio was 1:0.1:1.3.

TABLE VII

Properties of Compounds RM21 through RM30

| Compound | Fresh Tack, N | Aged* Tack, N | Fresh Cured Adhesion, N | Aged* Cured Adhesion, N |
|---|---|---|---|---|
| RM21 | 0.4 | 1.7 | 117 | 122 |
| RM22 | 7.6 | 19.7 | 114 | 113 |
| RM23 | 8.8 | 21.6 | 111 | 112 |

TABLE VII-continued

Properties of Compounds RM21 through RM30

| Compound | Fresh Tack, N | Aged* Tack, N | Fresh Cured Adhesion, N | Aged* Cured Adhesion, N |
|---|---|---|---|---|
| RM24 | 8.1 | 14.5 | 113 | 114 |
| RM25 | 6.9 | 20.5 | 138 | 169 |
| RM26 | 7.3 | 18.9 | 112 | 126 |
| RM27 | 6.0 | 23.2 | 101 | 93 |
| RM28 | 7.5 | 16.7 | 105 | 105 |
| RM29 | 6.9 | 15.3 | 107 | 100 |
| RM30 | 8.4 | .7 | 93 | 101 |

*Aging was done by exposing the test surface for four days at room temperature prior to preparing test pieces.

All fresh and aged cured adhesion test pieces showed a knotty tear (i.e., segments of rubber protruding from each half of the torn specimen) as opposed to an undesirable smooth tear. Tack was determined by the previously detailed TACK Test.

The cured adhesion, which determines the interfacial adhesion between compounds, was measured using the ADHESION Test detailed below at 95° C.

The materials required for the test include a force displacement tester with oven or equivalent available from Instron, Inc, a clicker die that is 149×149 mm (5.875×5.875 in) for cutting uncured compound, a 51-mm wide roller for stitching compound to fabric backing, a Gang die having six 25 mm (1 in.) cavities for cutting the cured test specimens, diaphragm curing molds for curing test blocks, cord reinforced rubber backing having a gauge of 1.0 to 1.27 mm (0.40 to 0.50 in.), Mylar™ sheets containing four evenly spaced 5-mm wide by 100-mm long windows, and bladder stock.

Mylar™ was removed from one side of each sheet, and fabric backing was applied to the sample. The cord direction was parallel to the sample mill grain. The sample was stitched with a 51-mm (2 in.) wide roller. Uncured samples 150×150×2.4 mm (5.875×5.875×0.95 in.) were cut from each sample to be tested. The cord fabric backing was parallel to the grain direction.

The press was set for an air line pressure of 7 bars (100 psi), and the cure time was set. The sample was placed in the bottom cavities of the preheated diaphragm curing mold. The samples were covered with a sheet of cellophane, and the curing bladder was put on top of the cellophane. The top plate was put on top of the curing bladder and put in the curing press.

The sample was cured and the mold was removed from the press. The top plate, cellophane and bladder were also removed. The samples were removed from the mold cavities and allowed to cool at room temperature.

Four 25-mm wide test strips were cut out of the sample so that the Mylar™ window was as near to the middle of the test sample as possible. The sample was pulled apart at the open end, and the Mylar™ was cut off. The tab ends were inserted into the grips of the testing machine. The samples was tested at 51 mm/min, and the samples were conditioned in the oven for 15 minutes at about 95° C. The cured adhesion is the force required to pull the sample apart, and the steady state average load in Newtons is reported in Tables.

Both the fresh cured adhesion and aged cured adhesion were measured using the ADHESION Test. The test results show that both the aged tack and aged cured adhesion were slightly higher than the fresh values. With respect to tack, this may indicate that the temperature and humidity in the uncontrolled aging environment were significantly higher on the day the aged tack was measured than on the day the fresh tack was measured. With respect to cure adhesion, the aged cured adhesion may be slightly higher in accordance with the standard deviation of the test.

The above specification and examples provide a complete description of the invention. Since many embodiments of the invention can be made without departing from the spirit and scope of the invention, the invention resides in the claims hereinafter appended.

What is claimed is:

1. A method of protecting a tread, said method comprising the steps of:

(a) preparing a curable rubber compound comprising:
  (i) a formulated fatty acid;
  (ii) carbon black;
  (iii) napthenic or paraffinic oils;
  (iv) rubber; and
  (v) curing agent, wherein the compound has a tack of at least about 3 Newtons;

(b) extruding the compound to form a tread;

(c) securing any tread splice; and (d) coating an outer surface of the tread with a material consisting essentially of wax.

2. A method of protecting a tread, said method comprising the steps of:

(a) preparing a curable rubber compound comprising:
  (i) an alkylated napthenic or aromatic resin;
  (ii) carbon black;
  (iii) rubber; and
  (iv) curing agent, wherein the compound has a tack of at least about 3 Newtons;

(b) extruding the compound to form a tread;

(c) securing any tread splice; and (d) coating an outer surface of the tread with a material consisting essentially of wax.

* * * * *